March 3, 1953   F. R. BRYANT ET AL   2,630,249
LIQUID FERTILIZER FEEDER FOR IRRIGATION SYSTEMS
Filed Aug. 9, 1948
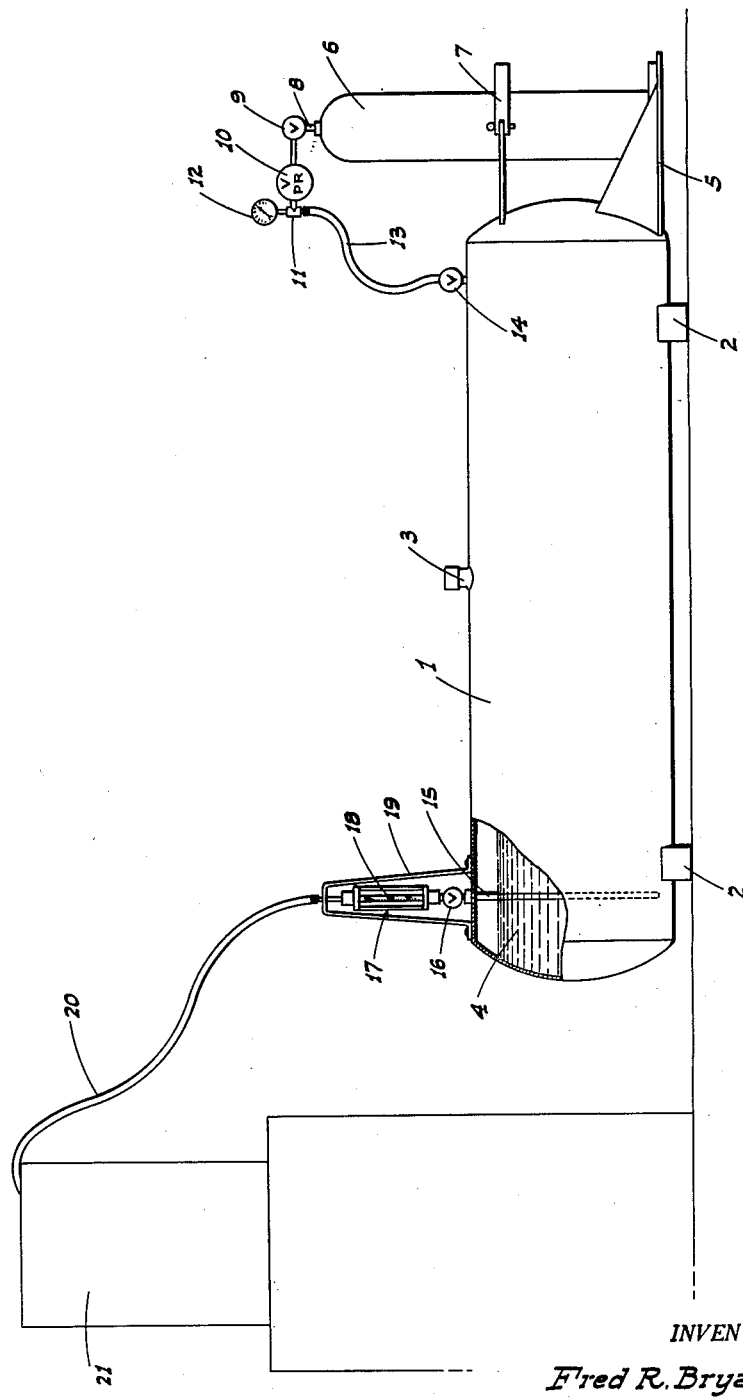
INVENTORS
Fred R. Bryant
Edward A. Brown
ATTYS Patented Mar. 3, 1953

2,630,249

UNITED STATES PATENT OFFICE 2,630,249

LIQUID FERTILIZER FEEDER FOR IRRIGATION SYSTEMS

Fred R. Bryant and Edward A. Brown, Shafter, Calif.

Application August 9, 1948, Serial No. 43,314

1 Claim. (Cl. 222—399)

This invention is directed to, and it is an object to provide, a novel feeder adapted to automatically supply concentrated liquid fertilizer to the water of an irrigation system in a constant, predetermined and accurately metered quantity.

Another object of the invention is to provide a liquid fertilizer feeder which is operative to function, as above, regardless of the lift required to gain access to, or back pressure encountered at, the point of feeding into the irrigation system; this being accomplished by a novel pressure supply arrangement in connection with the feeder.

A further object of the invention is to provide a liquid fertilizer feeder, as in the preceding paragraph, wherein the pressure supply is derived from a portable, readily replaceable cylinder of extremely high pressure compressed gas, such as nitrogen.

An additional object of the invention is to provide a liquid fertilizer feeder which is of unitary construction and thus conveniently movable from place to place, as working conditions may require.

It is also an object of the invention to provide a liquid fertilizer feeder which is designed so that the liquid fertilizer is not exposed to atmosphere, with undesirable oxidation or evaporation, during the feeding operation. Also, temperature, and atmospheric changes, have no material effect on proper functioning of the feeder.

A further object of the invention is to provide a practical and reliable liquid fertilizer feeder for irrigation systems, and one which will be exceedingly effective for the purpose for which it is designed.

These objects are accomplished by means of such structure and relative arrangement of parts as will fully appear by a perusal of the following specification and claims.

The figure of the drawing is a somewhat diagrammatic elevation of the feeder.

Referring now more particularly to the characters of reference on the drawing, the novel, liquid fertilizer feeder for irrigation systems comprises a relatively large supply tank 1, preferably of horizontally elongated configuration, and which tank may be supported by base blocks 2. At the top the tank 1 is provided with a normally closed fitting or cap 3 by means of which said tank may be substantially filled with a quantity of concentrated liquid fertilizer 4.

At one end the tank is fitted with a rigid, longitudinally projecting platform 5 disposed adjacent the bottom of the tank, and which platform is adapted to receive and support a replaceable cylinder 6 of gas, such as nitrogen, at extremely high pressure.

The cylinder 6 is maintained in place on the platform 5 by a releasable stabilizing yoke 7.

An outlet conduit 8 leads from the top of the replaceable cylinder 6, and said conduit has a manual valve 9 interposed therein. The outlet conduit 8 connects, beyond the manual valve 9, with a pressure regulating valve 10, which in turn delivers to a T-fitting 11. A pressure gauge 12 is connected to one side of the T-fitting 11, and a flexible conduit 13 leads from the other side of the T-fitting 11 to communication with the tank 1 at the top thereof and at the adjacent end. Another manual valve 14 is interposed in the conduit 13 adjacent the tank 1.

The tank 1, at the end opposite the replaceable cylinder 6, is fitted internally with a vertical feeder tube 15, which extends in the tank from adjacent the bottom thereof upwardly through the top of the tank, and there connects with a third manual valve 16.

The manual valve 16 delivers, at the top, into an upstanding, flow-rate meter 17 of visual, calibrated, float type; such meter including the metering float 18 which reads on the calibrations. The flow-rate meter 17 is shielded within an upstanding, inverted U-shaped guard 19.

A feeder conduit 20, which is mainly of flexible hose, leads from the top of the flow-rate meter 17 and is adapted to feed, at the discharge end, into a water passage member of an irrigating system, here shown—for the purpose of illustration—as a stand pipe 21.

In operation, the device functions as follows, after filling of the tank 1 with a concentrated liquid fertilizer and placement of the feeder conduit 20 for discharge into the water passage member 21 of the irrigation system:

Firstly, the manual valves 9, 14, and 16 are opened; the pressure regulating valve 10 being set to maintain a predetermined head of gas under pressure on the liquid fertilizer 4 in the tank 1. This predetermined pressure is reflected by the pressure gauge 12.

The manual valve 16 is adjusted to a position at which the meter 17 indicates a flow (usually determined in gallons per hours) which the operator desires. Thereafter, the feeder functions automatically and continues to supply concentrated liquid fertilizer into the water in the passage member 21; such supply feeding in such constant and predetermined quantity regardless of the lift required to reach, or the back pressure encountered at, the point of discharge. This is of extreme advantage in those cases where the feeder conduit 20 is coupled to a water passage member of a closed irrigation system, and wherein the feed is into water running under pressure. Irrespective of this pressure, the instant feeder can be set to introduce the liquid fertilizer into the irrigation system in a continuous and accurately metered quantity.

The device is also advantageous for the reason that the concentrated liquid fertilizer 4 is not exposed to the atmosphere once it has been placed in the tank 1; the entire feeder arrangement being closed between said tank 1 and the point of discharge into the water passage member 21. Likewise, by virtue of the closed pressure system, temperature or atmospheric conditions have no adverse effect on proper and effective functioning of the device. To stop operation of the device, the operator need only close the manual valves 9, 14, and 16.

When the supply of high pressure gas in the replaceable cylinder 6 is exhausted, said cylinder is removed by release of the stabilizing yoke 7, and a new cylinder is placed on the platform 5; being connected to the pressure regulated valve 10 as heretofore described.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a liquid fertilizer feeder apparatus which includes a pressure tight elongated tank for liquid fertilizer, said tank being ground supported in an exposed position with its axis horizontal, an intake fitting on top of the tank adjacent one end thereof, a platform rigidly secured on said end of the tank only and projecting from said end of the tank adjacent but above ground level, a replaceable pressure-gas cylinder seated on the platform and having a flexible conduit removably connected with said fitting, the area of the platform being materially greater than that of the base of the cylinder and being unconfined across its outer end, and a releasable protector guard mounted on said end of the tank adjacent the top and loosely surrounding the cylinder.

FRED R. BRYANT.
EDWARD A. BROWN.

REFERENCES CITED

The following references are of record in the file of this patent:

UNITED STATES PATENTS

| Number | Name | Date |
|---|---|---|
| 851,274 | Brent | Apr. 23, 1907 |
| 1,290,544 | Graumann | Jan. 7, 1919 |
| 1,361,752 | Cross | Dec. 7, 1920 |
| 1,562,633 | Goss et al. | Nov. 24, 1925 |
| 1,667,923 | Bishop | May 1, 1928 |
| 1,707,938 | Hawxhurst | Apr. 2, 1929 |
| 1,808,854 | Malone | June 9, 1931 |
| 1,985,570 | Haven | Dec. 25, 1934 |
| 2,321,041 | Porter | June 8, 1943 |
| 2,421,765 | Taylor | June 10, 1947 |
| 2,508,142 | Brothman | May 16, 1950 |